United States Patent
Lucas

(10) Patent No.: US 10,696,902 B2
(45) Date of Patent: *Jun. 30, 2020

(54) AUTOMATED BATCH CONTROL OF DELAYED COKER

(71) Applicant: BP Corporation North America Inc., Houston, TX (US)

(72) Inventor: Richard Lucas, Whiting, IN (US)

(73) Assignee: BP Corporation North America Inc., Houston, TX (US)

(*) Notice: Subject to any disclaimer, the term of this patent is extended or adjusted under 35 U.S.C. 154(b) by 149 days.

This patent is subject to a terminal disclaimer.

(21) Appl. No.: 15/824,386

(22) Filed: Nov. 28, 2017

(65) Prior Publication Data

US 2018/0119018 A1    May 3, 2018

Related U.S. Application Data

(62) Division of application No. 14/400,566, filed as application No. PCT/US2013/040258 on May 9, 2013, now Pat. No. 9,862,889.

(60) Provisional application No. 61/646,021, filed on May 11, 2012.

(51) Int. Cl.
  *G05B 11/01* (2006.01)
  *C10B 41/00* (2006.01)
  *C10B 55/00* (2006.01)

(52) U.S. Cl.
  CPC .............. *C10B 41/00* (2013.01); *C10B 55/00* (2013.01); *G05B 11/01* (2013.01)

(58) Field of Classification Search
  CPC .......... G05B 11/01; C10B 41/00; C10B 55/00
  See application file for complete search history.

(56) References Cited

U.S. PATENT DOCUMENTS

| | | |
|---|---|---|
| 3,936,358 A | 2/1976 | Little |
| 4,176,052 A | 11/1979 | Bruce et al. |
| 4,358,343 A | 11/1982 | Goedde et al. |
| 4,698,313 A | 10/1987 | Stewart |

(Continued)

FOREIGN PATENT DOCUMENTS

| | | |
|---|---|---|
| CN | 201145850 | 11/2008 |
| CN | 102073271 | 5/2011 |

(Continued)

OTHER PUBLICATIONS

HP Innovations/Control Application Integrates Multiple Technologies/ Hydrocarbon Processing (Jun. 1997), vol. 76, No. 6, pp. 31.

(Continued)

*Primary Examiner* — Shogo Sasaki
(74) *Attorney, Agent, or Firm* — McDonnell Boehnen Hulbert & Berghoff LLP

(57) ABSTRACT

An automatic batch sequence computer control system is configured to automatically operate process valves in a delayed coker for a complete coke drum cycle. Double verification of the movement of the process valves is used to confirm advancing to the next step. Primary verification is achieved by using position sensors on the valves. Secondary verification is achieved by using monitored process conditions and confirming the measured conditions correlate with expected process conditions for an arrangement of valve positions at a given sequence in the coke drum cycle. A safety interlock system may be integrated with the control system.

8 Claims, 4 Drawing Sheets

(56) References Cited

U.S. PATENT DOCUMENTS

| | | | |
|---|---|---|---|
| 4,929,339 | A | 5/1990 | Elliott, Jr. et al. |
| 5,024,730 | A | 6/1991 | Colvert |
| 5,450,346 | A | 9/1995 | Krummen et al. |
| 7,081,196 | B2 | 7/2006 | Cullen |
| 7,117,959 | B2 | 10/2006 | Lah |
| 7,513,977 | B2 | 4/2009 | Koerner et al. |
| 8,851,451 | B2 | 10/2014 | Orino et al. |
| 2003/0051988 | A1 | 3/2003 | Gunnerman et al. |
| 2005/0269197 | A1 | 12/2005 | Beala et al. |
| 2008/0109107 | A1 | 5/2008 | Stefani et al. |

FOREIGN PATENT DOCUMENTS

| | | |
|---|---|---|
| EP | 0 155 757 | 3/1987 |
| EP | 0910614 | 4/1999 |
| EP | 1322724 | 7/2003 |
| MX | PA06012153 | 7/2009 |
| SU | 43114 | 5/1935 |
| WO | WO 2008/057403 | 5/2008 |

OTHER PUBLICATIONS

"Delayed Coking Drums," Application Report, Metso Automation, Inc., May 2011, 6 pages.
"New Developments: Coker Drum Safety System for Crude Oil Refineries, "Hydrocarbon Processng (Nov. 2010), vol. 89, No. 11, 1 page.
"Preventing Unsafe Actions by Coker-Drum Operators," Chemical Engineering, (Mar. 28, 2011 ), vol. 118, No. 1, pp. 47-50.
Arney et al., "Coke Drum Valve Automation & Permissives Justification, Design, and Implementation," Valero Energy Corp., Oct. 5, 2005, 32 pages.
Botros, I., Automated Decoking Solves Coker Safety Challenges,1 Hydrocarbon Processing (Nov. 2011) vol. 90, No. 11, pp. 47-50.
DiEfsi, D.P., et al., "A Modern Delayed Coker Pilot Plant," Energy Prog. (Dec. 1983), vol. 3, No. 4, pp. 193.
Adams, J., "Coking 101 An Introduction to Delayed Coking," Process Engineering Associates, LLC, 26 pages.
Elliot, John D., "Delayed Coking Innovations and New Design Trend," Foster Wheeler USA Corporation, 19 pages.
G. Hua, "Application of CyboCon Advanced Adjustment and Control Software Package in Delayed Coking Unit," China Petroleum Processing, (Mar. 2002), No. 1, pp. 51-55.
Isham, M., "Implementation of the Total Automation Concept in Today's Delayed Coker Unit," Heavy Oil Conf. 2011, Foster Wheeler USA Corp., May 2011, 23 pages.
McGrievy, L.H., "Microprocessor Maximizes Coker Thruput," Hydorcarbon Process, V58 N.3 107-111, (Mar. 1979) (Oct. 19, 1978}, vol. 58, No. 3, pp. 107-111.
Zachary, B. et al., Introduction to the SJS Standards and Application to Coker Processes,11 Valero Energy Corporation, 2006, 25 pages.
Zhang, L., Technical Progress of Domestic Delayed Coking Unit/ Petroleum Refinery Engineering (Jun. 15, 2005), vol. 35, No. 6, pp. 1 7.
Zhang, L., et al., "Technical Progress of China's Delayed Coking Technology," China Petroleum Processing and Petrochemical Technology (Dec. 2005), No. 4, pp. 1-13.
Zhu, H., Application of Advanced Process Control in Delayed Coking Unit,11 Petroleum Refinery Engineering (Sep. 15, 2008), vol. 38, No. 9, pp. 45-49.
U.S. Pat. No. 7,66,278 B2 to Lah, issued Feb. 23, 2010, withdrawn from issue Feb. 23, 2010; re-issued as U.S. Pat. No. 7,820,014.
Lu et al., "Application of PLC in Hydraulic Decoking . . . ", Automation in Petro-chemical Industry, vol. 47, No. 6, Oct. 31, 2011, pp. 49-53.
Lin et al. "Automatic Control Technology of Hydraulic Decoking . . . " Petroleum Refinery Engineering, vol. 36, No. 12, Dec. 31, 2006, pp. 47-50.
Predel, "New Developments in Delayed Coker Operations," Metals & Materials Soc (TMS), USA, Jan. 1, 1992, p. 617.

AUTOMATED BATCH CONTROL OF DELAYED COKER

This application is a divisional of application Ser. No. 14/400,566, filed Nov. 12, 2014, the entire content of which is hereby incorporated by reference.

BACKGROUND

A delayed coker is a unit that thermally converts vacuum distillation column bottoms residue product into lighter distillate and coke. The coking process is primarily a semi-batch process with two or more coke drums operating in pairs in alternating cycles—one drum is filled while the other is emptied. Typically, one coke drum is filled with a batch of heated feed material, such as vacuum distillation column bottoms residue product (also known as "vacuum resid"), that has been heated to a high temperature, between about 830 to 950 degrees Fahrenheit ("° F."), at a low pressure, between about 15 to 60 pounds per square inch gauge ("psig"). The batch of feed material is allowed to thermally react in the coke drum for a period of time. The gaseous reaction products of the thermal cracking are removed from the top of the coke drum and sent to a fractionator. The remaining reaction products remain in the drum and solidify into a product known as petroleum coke, or simply coke. The coke drum is then steamed, cooled and vented, after which the coke drum is opened to the atmosphere and the coke is removed from the drum by cutting it up with high pressure water into small chunks and allowing it to drop out of a large opening at the bottom of the drum. Typically, a single batch of coke may be formed during one cycle that allows the coke drum to be filled for a coking period of between 12 to 18 hours. Thus, one complete fill, coke and unload cycle typically will be double this time.

Originally, this process was operated manually. Human operators would open and close valves manually in a pre-determined sequence to route the feed to one coke drum, while other valves are opened and closed to isolate the other drum that is full of coke product ready to be emptied. The delayed coker unit may include up to twenty or more sets of valves for each coke drum, with some valve sets including two valves for a double-block isolation. As such, it can be a very labor intensive operation to open and close the valves in a precise sequence required for safe operation of the delayed coker during each coke drum cycle with very short times of at most a few hours between each step requiring numerous valve position changes. Because some valves in the unit are on process lines that are exposed to both hydrocarbons and the atmosphere at different parts of the cycle, it is important to avoid exposure of hot hydrocarbon to oxygen by verifying the right valves are closed and/or open at each step of the process.

Beginning in the 1990's, delayed coker process units began to take advantage of automation equipment. Manually operated isolation valves were replaced with locally operated motor operated valves and then remotely controlled motor operated valves. Additional double block valves for ensured isolation were installed in some locations. Remotely operated automated top and bottom deheading valves replaced manually operated deheading valves. Electronic safety interlock systems were added to verify valve position and prevent operators from opening the wrong valves or correct valves at the wrong time that might expose heated hydrocarbons to the atmosphere, or expose the operators to the hot hydrocarbons. Partial automation of portions of a delayer coker operation have been proposed. Despite these improvements, the operation of a delayed coker still requires significant labor of human operators in the unit.

SUMMARY OF THE INVENTION

One embodiment of the invention is a method for automatic operation of a delayed coker. The method includes providing an automatic batch sequence control system configured to automatically operate process valves in a delayed coker for a complete coke drum cycle. The method carried out by the control system includes verifying a position of a process valve in a first step of the sequence before advancing to a next step of is the sequence. Verifying the position for a set of double block valves includes a primary and a secondary verification. The primary verification includes receiving signals from a position sensor on each of the double block valves that detect that the position of each of the double block valve is in the correct open or closed position. The secondary verification includes receiving a signal from a pressure transmitter that the pressure in the process piping between the double block valves is correctly below or above a predetermined threshold depending on whether the set of double block valves has been commanded to open or close, respectively.

Additional embodiments of the invention and the advantages appurtenant thereto are described in more detail below with reference to the enclosed drawings.

DETAILED DESCRIPTION OF THE PREFERRED EMBODIMENTS

Embodiments of the present invention may provide several advantages. A batch sequence controller, as described in more detail below, may be provided to remotely and automatically operate the valves in a delayed coker to automatically proceed through an entire coke drum decoking cycle, and to ensure that each previous step is safely completed before proceeding to the next step. This may significantly reduce the risk to personnel by allowing personnel to operate the coke drum unit remotely from the operating room.

Figure 1:
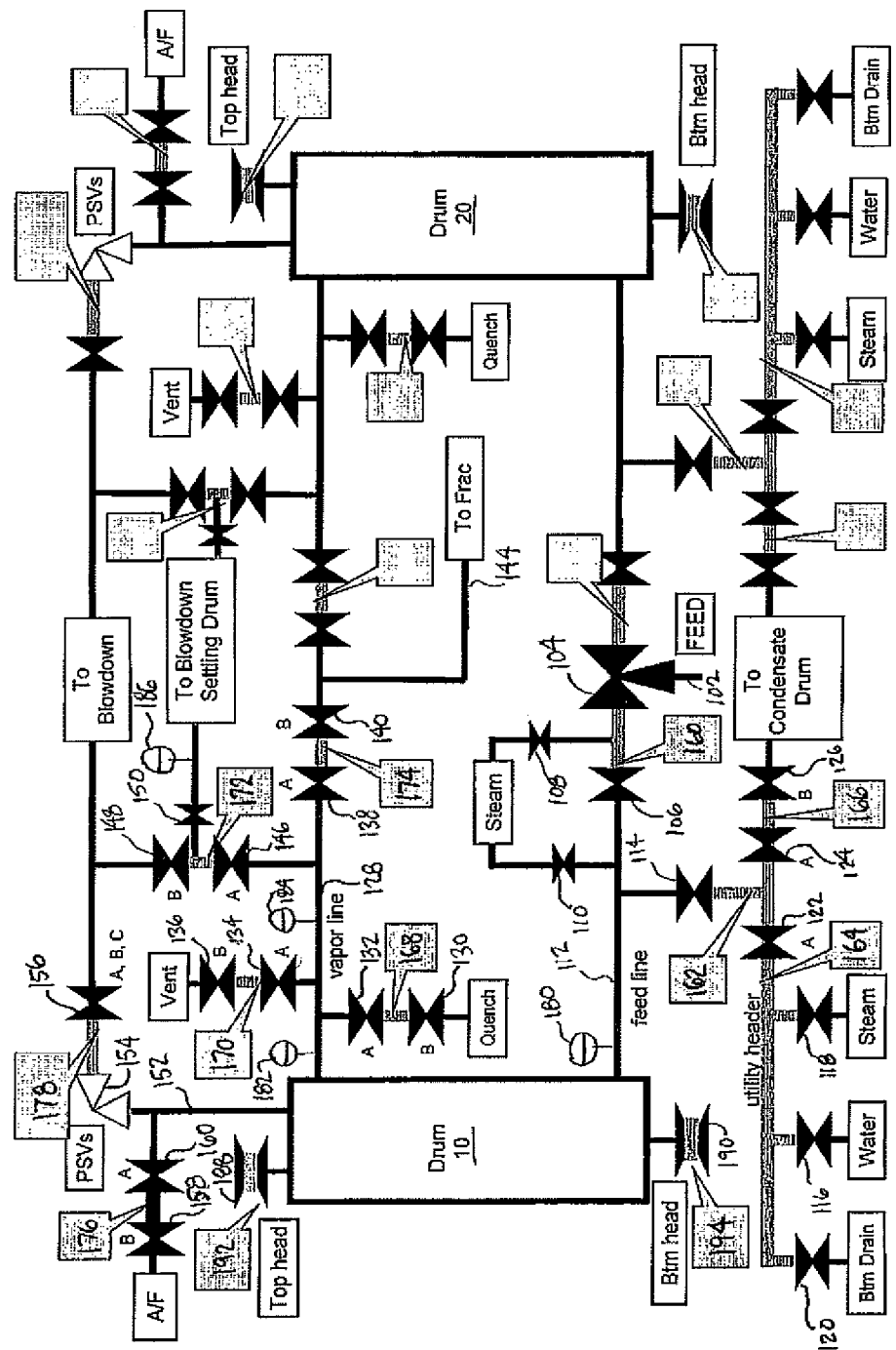
FIG. 1 is a representative process flow diagram of a two-drum delayed coker unit according to one embodiment of the invention.

Referring to the embodiment of FIG. 1, a representative piping and flow diagram for a delayed coker with two coke drums in parallel is shown. The diagram include major process lines, automated valves, double block isolation points and major process measurement points. Connecting with the bottom of the first coke drum 10, the vacuum residual feed 102 is introduced through the feed switch valve 104. When filling the first coke drum 10, the feed switch valve 104 is open in line with the first coke drum 10 and feed isolation valve 106 is open. Steam is supplied to a feed isolation steam valve 108 and a steam sweep valve 110 on the feed line 112. The feed line 112 also has connected to it the common utility header valve 114, which is connected to a utility isolation valve 122 for isolating a common a utility header for a quench water supply valve 116, a steam supply valve 118, and a bottom drain valve 120. The common utility header valve 114 also connects with the condensate drain double block valves 124 and 126. The common utility header valve 114 is closed while the coke drum is being filled with feed.

Connecting with the top of the coke drum 10, the overhead vapor line 128 is connected with several valves including the double block overhead quench valves 130 and 132, the vent double block valves 134 and 136, the main vapor double block valves 138 and 140, which connects to the fractionator feed line 144. Also, connected with the overhead vapor line 128, are the blowdown double block valves 146 and 148, which include a vapor line drain valve 150 directing flow to the blowdown settling drum. Also at the top of the coke drum 10 is an overhead relief line 152, which connects with the pressure relief valve(s) 154 and pressure relief isolation valve(s) 156 that direct flow to the blowdown. The overhead relief line 152 also serves as feed line for the antifoam double block valves 158 and 160, which direct antifoam additive during the coke drum filling step.

Various pressure sensor transmitters and temperature sensor transmitters are included throughout the equipment to provide process status inputs to the batch sequence control system. The pressure measurements may be used for secondary verification of the correct valve positions by confirming the expected process pressures correspond to the expected pressure given a particular set of valve positions and step in the coke drum cycle sequence. Likewise, the temperature measurements may be used to confirm the expected conditions correlate with the expected process temperature for the defined valve positions for that step in the coke drum cycle sequence. Accordingly, pressure transmitters may be located at the various valve isolation points or between double block valve configurations including the feed isolation point 160, the common utility header isolation point 162, the utility header isolation point 164, the condensate drain isolation point 166, the overhead quench line isolation point 168, the overhead vent isolation point 170, the blowdown isolation point 172, the main vapor isolation point 174, the antifoam isolation point 176 and the pressure relief valve isolation point 178. The delayed coker also may include other process measurement transmitters including coke drum feed line pressure 180, the coke drum overhead pressure 182, the coke drum overhead temperature 184 on the vapor line 128, and the vapor line drain line temperature 186.

In the embodiment of FIG. 1, the coke drum includes the top head valve (also known as deheading valve) 188 and the bottom head valve (also known as deheading valve) 190, which are opened only during the coke unloading phase of the coke drum cycle. These deheading valves may be special motor or hydraulic operated slide valves, such as those manufactured by DeltaValve, e.g., Models GV320 and GV380, that have low pressure steam purges in the body to maintain a pressure in the valve body higher than the process pressure to keep the valves seats and seals clean, and maintain a positive steam pressure isolation point between the hydrocarbon process environment and the atmosphere. Pressure transmitters 192 and 194 are included monitoring the steam pressure on the interior bodies of these valves, respectively. The pressures may be monitored as secondary verification of the deheading valve positions, because the steam pressure is above a predetermined threshold when the valves are in the fully closed position.

While the above valves and process measurement transmitters have been described for the first coke drum 10, preferably an identical set of valves and process transmitters are used for similar operation of the second coke drum 20. Coke drum operations may vary depending on the configuration of the equipment and piping and the above description is illustrative of one embodiment.

For safe operations of a delayed coker, hot hydrocarbons should be isolated from exposure to the atmosphere. Double block valves may be used throughout the delayed coker to provide isolation points that separate hydrocarbons from oxygen environments. In some embodiments of the present invention, the batch sequence control scheme uses both primary verification and secondary verification of a valve position as either open or closed. Although other double block valve configurations may be used, a typical double block valve configuration includes two ball valves (or other type of valves, such as gate valves or plug valves) with a steam pressure purge connected to the process piping between the two valves. The primary verification may include receiving signals from position sensors on the valves to indicate whether the valve is open or closed. The secondary verification may include receiving a process condition transmitted from a point in the process piping between the two valves. When both valves are closed, the steam purge pressurizes the process piping to a pressure above a predetermined threshold. For example, if the steam supply pressure is 100 psig, a pressure measurement from a pressure transmitter located on the process piping between the two valves which exceeds a predetermined threshold, for example, 70 psig, indicates that both valves are closed such that the process piping has been pressurized with steam. If one of the valves has not completely closed, the steam would leak out from between the two valves and the pressure would not rise above the threshold. Conversely, if both valves are moved from a closed position to an open position, the pressure between the two valves would decrease to below the threshold. Therefore, the pressure between the two valves provides a secondary verification that the valves have moved from a closed to an open position or an open to a closed position.

Figure 2:
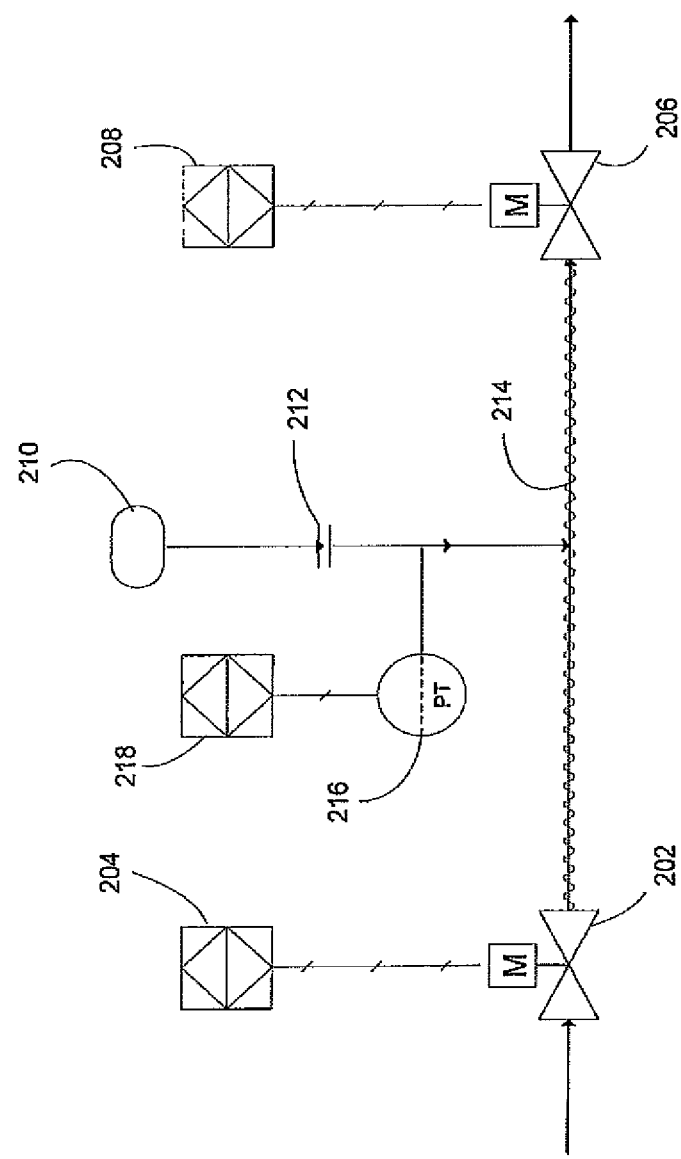
FIG. 2 is a representative schematic of double block valve and pressure piping and instrument diagram according to one embodiment of the invention.

Referring to the embodiment of FIG. 2, an exemplary configuration of a typical isolation point with a double block valve and pressure arrangement is shown. A first block valve 202, such as a metal seated ball valve manufactured by Velan, e.g., Model "Securaseal," may include a remotely operated motor operated actuator controlled by the batch sequence control computer system. The valve 202 includes position sensors that transmit an open position signal or a closed position signal to the control system input/output 204. For valves in "dirty" hydrocarbon service, a steam purge may be maintained on the valve stem to keep it clean. A similar valve and instrumentation configuration may be used for the second block valve 206 and control system input/output 208. Between the two block valves, a steam header 210 supply purge steam through a flow restrictor 212 to maintain a small flow of steam through a pressure instrument tap on the heat traced line 214 between the block valves 202 and 206. When both block valves are closed, the steam pressure builds up between the block valves to provide steam isolation between the two valves. A pressure transmitter 216 on the steam purge line provides a signal to the batch sequence control system that should indicate a high pressure when the block valves are closed and a low pressure when the block valves are open. The pressure measurement provides a secondary verification of the position of the double block valves. The need for draining condensate from certain blocked sections may be eliminated by installing high temperature heat tracing 214 to prevent steam condensation in the isolation points.

Accordingly, embodiments of the present invention include methods and systems to meet a high degree of safety integrity by using two independent methods in a batch sequence control system to confirm whether isolation points have been "closed" or "opened." As a primary verification, position sensors, such as proximity switches, may be used to confirm that both isolation valves are in their expected position. As a secondary verification, a pressure transmitter on the blocked section of process piping may be used to confirm that the blocked-in steam pressure has increased (if isolated) or decreased (if not isolated). The delayed coker, with reference to the embodiment of FIG. 1, may include the following isolation points with a pressure transmitter monitoring the pressure between the block valves or isolation valves:

1. feed isolation 160;
2. primary utility isolation 162;
3. secondary utility isolation 164;
4. preheat condensate isolation 166;
5. vapor line quench isolation 168;
6. vent to atmosphere isolation 170;
7. blowdown isolation 172;
8. vapor line isolation 174;
9. antifoam isolation 176;
10. pressure relief device isolation 178;
11. top head isolation 192;
12. bottom head isolation 194;

During operation of the delayed coker batch sequence controller, additional verification using process measurements may include the loss of pressure between pressure relief valve 154 and downstream block valve 156 as verification that relief valve is safely open to protect the drum. The temperature 186 on vapor line water condensate drain between blowdown valve 150 and blowdown settling drum may be used to verify that all water has been drained from the vapor line. The feed line pressure 180 may also be used to confirm the water level in the drum and when the drum has been fully drained of water, as a pressure higher than the overhead vapor line pressure 182 will indicate a static head of liquid in the drum. Thus, when the difference in pressures has decreased below a predetermined threshold indicating the drum has been drained a sufficient amount in step 17 below, the control system may advance to the next step 18 and initiate opening of the coke drum top deheading valve. The difference in pressures may also be used as a surrogate for the drum liquid level for a variety of purposes, including monitoring the level and tracking the rate of drum draining.

In addition, the feed line pressure 180 may also be monitored for comparison with the utility steam pressure 162. It may be desired to maintain continuous flow in the feed line after the feed is removed. Ensuring that the utility steam pressure is higher than the hydrocarbon feed line pressure 180 before closing feed isolation valve 106 allows the steam to be cut over into the feed line before the feed is closed and avoid feed material perhaps flowing into the utility steam line. Typically, the feed line pressure may be between 50 and 60 psig, and the utility steam supply header for this service may be about 100 psig. To cut the steam into the feed line, the steam isolation valve 118 and the secondary utility isolation valve 122 may be fully opened and then the primary utility isolation valve 114 may be opened slightly to maintain back pressure on the steam supply. As the back pressure, measured by the pressure transmitter on the common utility header isolation point 162 decreases below a predetermined threshold, this verifies that the primary utility isolation valve 114 has opened and steam is flowing into the feed line 112. After this verification, the feed isolation valve 106 may be closed. The exact thresholds used in the control system may vary depending on the pressures and temperatures of normal operation and the available steam supply pressure.

In addition to the built-in verifications of the batch sequence controller, the system may also include an integrated safety interlock system. The safety interlock system provides double security that the batch sequence controller will not move a valve that could cause a dangerous situation. The safety interlock system also may be active when the batch sequence controller is off-line and when the valves are manually operated from the control system. The safety interlock may use just the primary verification or both primary and secondary verification of valve positions described above to confirm the valve positions.

The safety interlock system may utilize a principle of a "clean/dirty" interlock. As used herein, "clean" refers to service primarily in communication with the atmosphere and "dirty" refers to service primarily in communication with hydrocarbons. This interlock principle ensures that (1) no "dirty," i.e., hydrocarbon, isolation points are opened until all "clean," i.e., atmospheric, isolation points are confirmed closed, and (2) no "clean," isolation points are opened until all "dirty" isolation points are confirmed closed. The term "isolation point" as used herein refers to a double block valve set or an isolation valve. This interlock may be implemented by identifying the valves that are the "dirty" hydrocarbon isolation points, identifying the valves that are the "clean" atmosphere isolation points, and confirming that all valves on hydrocarbon isolation points are closed before transmitting a signal to open a valve on an atmospheric isolation point; and confirming that all valves on an atmospheric isolation point are closed before transmitting a signal to open a valve on a hydrocarbon isolation point. The "dirty" isolating valves may include the main feed isolation valve 106, the condensate double block valves 124 and 126, the antifoam double block valves 158 and 160, the overhead quench double block valves 130 and 132, the main vapor line double block valves 138 and 140, and the blowdown double block valves 146 and 148. The "clean" isolating valves may include the top head valve 188, the bottom head valve 190, and the overhead vent double block valves 134 and 136. Optionally, the "clean" isolating valves may include one or more of the primary utility isolation valve 114, secondary utility isolation valve 122 or bottom drain valve 120.

The safety interlock system may be used to ensure that the bottom drain remains isolated from the blowdown lines and the fractionator. This is intended to avoid the back flow of hydrocarbon vapors from either the blowdown or the fractionator into the bottom drain line. This interlock may be implemented by confirming that either of the bottom drain valve 120 and the secondary utility isolation valve 122 are closed before any one of the main vapor line double block valves 138 and 140 and the blowdown double block valves 146 and 148 are commanded to open. Further, all of the main vapor line double block valves 138 and 140 and the blowdown double block valves 146 and 148 must be confirmed closed before both of the bottom drain valve 120 and the secondary utility isolation valve 122 may be commanded to be opened.

The safety interlock system may also be used to ensure that the coke drum cannot be over pressured. An interlock referred to as a "pressure relief/vent" interlock may ensure that (1) the pressure relief block valve cannot be closed until the vent double block valves are confirmed open, and that (2) the vent double block valves cannot be closed until the pressure relief block valve is confirmed open. This interlock may be implemented by receiving primary verification and secondary verification that the vent double block valves are open before transmitting a signal to close the pressure relief block valve; and by receiving primary verification and secondary verification that the pressure relief block valve is open before transmitting a signal to close the vent valves.

The safety interlock system may include other interlock principles as may be known in the art. Conventionally, interlock safety system were a well-established system developed to normally enhance the manual steps performed by the operator during the coke drum cycle. In an embodiment of the present invention, these interlocks remain active at all times and work within the batch sequence control system so that only the valves that are allowed to move can operate.

The batch sequence controller automatically operates multiple process valves to advance the coke drum cycle from one phase to the next. During a complete cooking cycle, the major phases include after the drum is filled, switching feed to the alternate empty drum, steaming out the coke-filled drum to the fractionators and then to the blowdown, quenching, draining, de-coking and emptying the drum, steaming out the empty drum, preheating the drum, switching the feed valve back to the empty drum, filling the drum with feed, and allowing the coke to form. An exemplary coke drum decoking cycle controlled by the batch controller may include more detailed steps as follows:

1. switching feed from full drum to empty drum;
2. steaming full drum feed isolation section and feed line;
3. closing feed isolation valve and confirming isolation by two independent methods;
4. drying steam to pit, then closing drying valve prior to opening steam to the process;
5. opening steam to the process to achieve "small steam" to the fractionators;
6. depressure full and steaming drum to the blowdown scrubber;
7. isolate (close) drum vapor line to the fractionators;
8. increase steam to the full drum to achieve "big steam" to the blowdown scrubber;
9. start quench water to the full drum;
10. stop steam to the full drum;
11. increase quench water to the full drum;
12. isolate (close) antifoam from the full drum;
13. isolate (close) drum vapor line to the blowdown system;
14. open drum atmospheric vent;
15. isolate (close) pressure relief valves from the full drum;
16. close water to drum;
17. open drain from drum;
18. open top head;
19. open bottom head;
20. decoke drum;
21. close bottom head;
22. close top head;
23. open steam to feed line and bottom drain;
24. close bottom drain;
25. open pressure relief valves on drum;
26. isolate (close) atmospheric vent on drum;
27. drain water from vapor line;
28. isolate (close) steam and secondary utility header from drum;
29. open vapor line valves;
30. open preheat condensate drain;
31. open steam and drain to dry steam on ADJACENT (newly full) drum;
32. isolate (close) preheat condensate from preheated drum;
33. open feed isolation valve;
34. move switch valve from full drum to preheated drum.

In each step of the sequence, preferably just one or two sets of valves are commanded to move. To advance to the next step, the batch sequence control system requires that primary verification of the valve position must be received along with secondary verification of the valve position as indicated by a monitored process parameters, such as the pressure between a double block valve, or a process pressure behind an isolation valve. In addition, it may be required that other monitored process conditions are satisfied before advancing to the next step.

To facilitate the plant operators in monitoring the automatic sequencing of the coke drum cycle, a graphical representation of the coke drum cycle sequence may be displayed on the operator workstations. One such representation may be a display of a coke drum sequence matrix that includes a column for each of the above detailed steps of the sequence. In each row of the column, the valve positions, the isolation point steam pressure and other key process variables may be shown. Colors may be used to highlight what actions are expected in each step and what critical isolations are being formed. The thresholds for the process conditions required to be satisfied in each step may also be shown. The display may show several steps of the sequence in a single view that scrolls across the columns as the sequence advances to subsequent steps. To facilitate operator training and manual operation of the delay coker drum cycle, the matrix may also be shown completely in a paper form.

Figure 3:
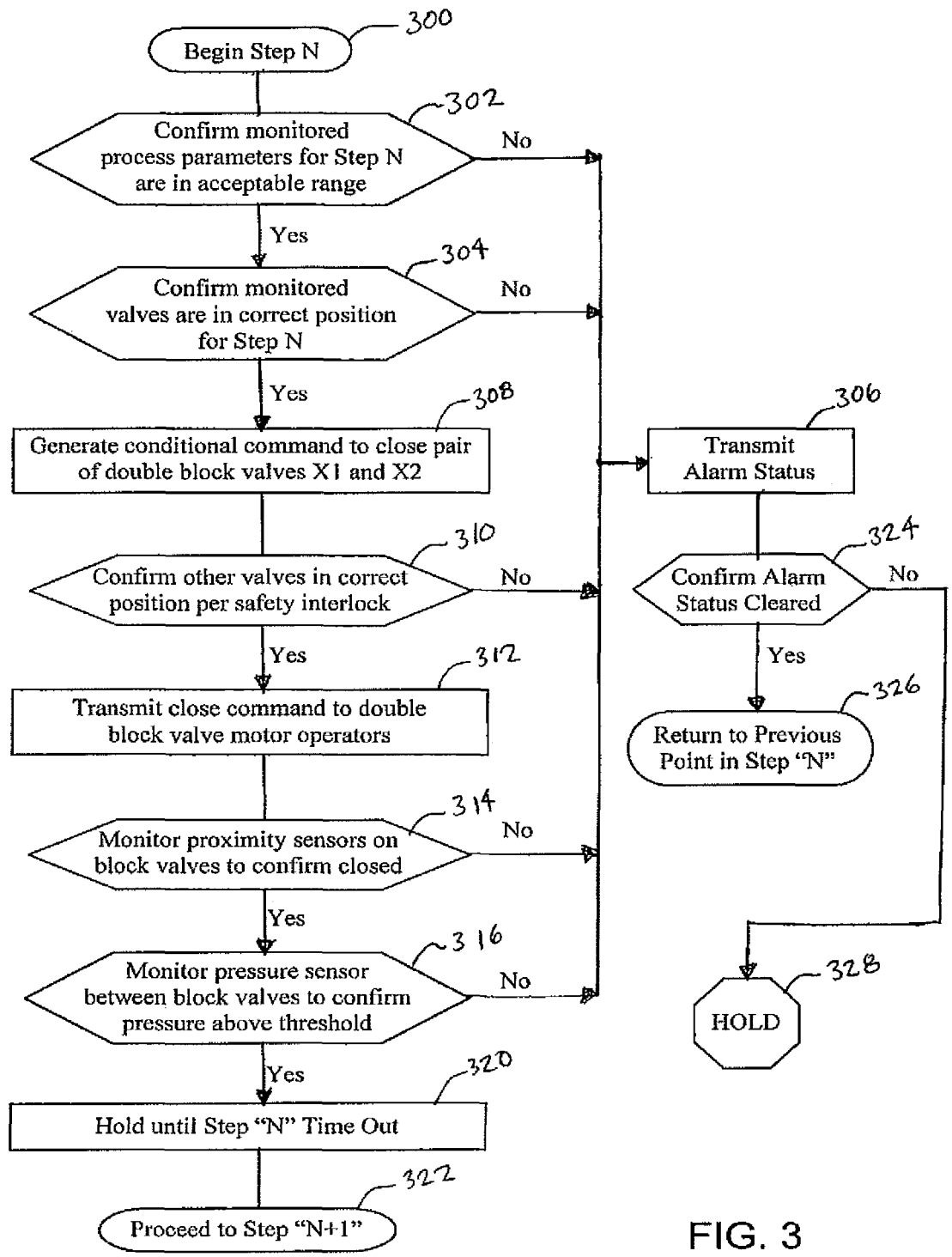
FIG. 3 is a representative logic flow chart for one exemplary step of a coke drum cycle in an automated sequence controller according to one embodiment of the invention.

Referring to FIG. 3, an illustrative embodiment of a flowchart of the conditions required in one typical step to advance to a next step of the batch control sequence is shown. While this flowchart is shown as a sequence of logical steps, the actual batch sequence control system may implement this logic in other sequences or in a parallel monitoring of conditions requiring satisfaction before advancing to the next step. For simplicity of illustration purposes, these conditions are shown in an exemplary sequence in the flowchart shown in FIG. 3. This flowchart may not coincide with actual implementation that may depend on the selected control system hardware and software platform configuration.

At the beginning of a batch control sequence Step "N", step 300, the batch control system may confirm that selected process parameters monitored for step "N" are within a predetermined range, or above or below a threshold that satisfy the control system logic, step 302. The batch control system also may confirm that selected valves monitored as required by the control system logic for step "N" are in the correct position, step 304. Some or all of the process inputs into the control system and the automated valves may be selected to be monitored for a given step depending on the level of safety requirements. If neither the monitored process parameters nor the monitored process valves are in the correct condition, then the control system may transmit an alarm to the control system display, step 306. If the selected process parameters are satisfied and the selected valves are in the correct position, the batch sequence controller generates a conditional command to close a pair of double block valves X1 and X2, step 308. The control system confirms that all other selected valves are in the correct position as required by the safety interlock system to permit the commanded valves X1 and X2 to close, step 310. If the selected valves are confirmed to be in the correct positions then the control system transmits the close command to the double block valve motor operators, step 312. If the selected valves are not in the correct position per the safety interlock then the control system transmits alarm status to the control system display, step 306.

As primary verification of valve position, the control system monitors the proximity sensors on the block valves that were commanded to close to confirm that the block valves have moved to the closed position, step 314. As secondary verification, the control system also monitors the pressure sensors between the block valves to confirm that the pressure in the process piping between the block valves have increased above a predetermined threshold, step 316. If neither primary verification nor secondary verification is confirmed then the control system transmits alarm status to the control system display, step 310. For steps that may be required to be in that state for an extended duration, the batch control system may hold the step until a timer times out, step 320. After the time out, the batch sequence controller may advance to the next step, step 322. It may be desirable to reconfirm process parameters and valve positions, steps 302 and 304, before proceeding to the next step.

After the alarm status has confirmed to be clear either by automatic detection or operator intervention, step 324, the control system may return to the previous point in the logical operation of step "N" where the controller was last engaged before the alarm status condition occurred, step 326. If the alarm status is not cleared, then the batch sequence controller will move into an indefinite hold position, step 328, requiring operator intervention to clear the alarm conditions and manually restart the batch sequence controller, or manually operate the coke drum cycle until the batch sequence controller can put back online.

The batch sequence control logic may be implemented as part of a conventionally known computer control system, such as a distributed control system or a programmable logic controller ("PLC") controller. The batch sequence control system may include the safety interlocks, or the safety interlocks may be implemented as a separate system. For example, a distributed process control system for the batch sequence controller may be implemented on a Delta V control system by Emerson Process Management. The safety interlock system may be implemented on the Delta V SIS and integrated with the Delta V distributed control system. The control system may also allow for manual remote operation of the coker process unit, but even in manual remote operation the safety interlock system may still override the movement of the valves.

Figure 4:
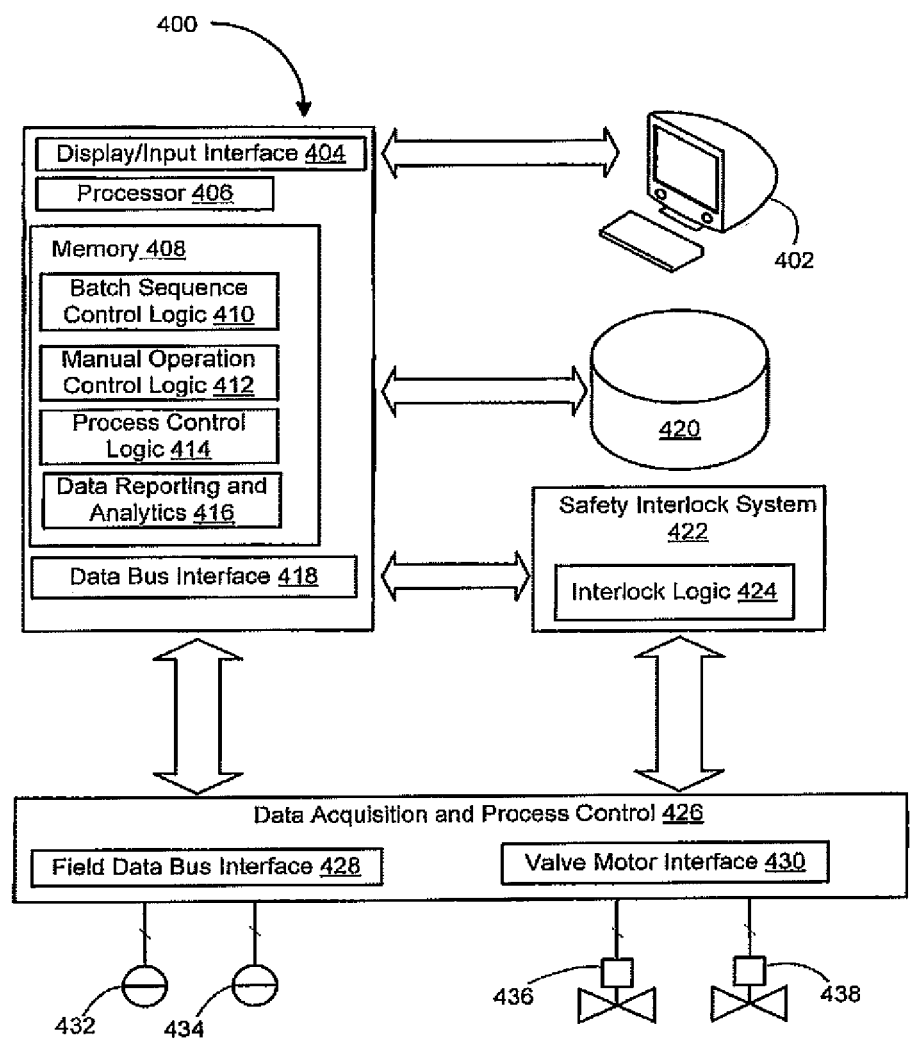
FIG. 4 is a schematic representation of an exemplary distributed computer control system for automated batch operation of a delayed coker according to one embodiment of the invention.

One embodiment of a distributed computer control system in a schematic representation is illustrated in FIG. 4. A distributed computer control system 400 may include operator work stations 402 in communication with the display/input interface 404 of the computer control system 400. Additionally, the operator work stations 402 may include an input device configured to allow a human operator to interact with any of the components of system. The input device may be a number pad, a keyboard, or a cursor control device, such as a mouse, or a joystick, touch screen display, remote control or any other device operative to interact with the system. These input devices may be useful when the delay coker drum cycle is being manually operated.

The computer control system may include one or more data processors 406 in communication with the data interfaces and one or more memory devices 408. The one or more data processors 406 may include a central processing unit (CPU), a graphics processing unit (GPU), or both. The processor may be a component in a variety of systems. For example, the processor may be part of a standard computer workstation, or a special computer control system or programmable logic controller. The processor may include one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The memory devices 408 may be a main memory, a static memory, or a dynamic memory. The memory may include, but may not be limited to computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like The memory 408 may include logic for operating various aspects of the delayed coker. Batch sequence control logic 410 may be stored in computer readable form in the memory 408 and includes computer executable instructions that when executed by the processor 408 carries out the method of operating an automated coke drum cycle. For example, the logic may include the method for automatically operating the delayed coker through all steps of the coke drum sequence, such as described above, or in other manners, and include details for a step of the sequence, such as illustrated in FIG. 3. Manual operation logic 412 for the delayed coker drum cycle may also be stored in memory 408, and may be executed by the processor 408 to allow manual operation of the delayed coker. The distributed control system may also include stored in memory 408 executable process control logic 414 for of other controlling and monitoring other process variables associated with the delayed coker. The distributed control system may also include data reporting and analytics logic 416 for management reporting of the process operations data stored in the historical operations database 420. The distributed control system may also include a data bus interface 418 for communicating with the safety interlock system 422 and the data acquisition and process control interface 426. The data acquisition and process control interface 426 may include the dedicated data acquisition and control hardware for communication through the field data bus interface 428 to the process transmitters 432 and controllers 434 in the delayed coker.

The safety interlock system 422 may include interlock logic 424 in the form of computer executable logic embodied in computer readable non-transient memory, or hard-coded in non-volatile memory on dedicated chipsets in a separate electronic control device, or may be in the form of dedicated electronic circuitry. The safety interlock system 422 may be a separate system or may be integrated into the main computer control system with the batch sequence controller. The safety interlock system 422 may be implemented to override the valve commands transmitted from either the batch sequence control operations or from manual control operations. As such, valve commands submitted under control of either or both operation systems may pass through the safety interlock system 422 before being transmitted to the data acquisition and process control equipment that includes the valve motor interface 430 to the motor operated, or hydraulic operated process valves 436 and 438 in the delayed coker unit.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations. The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

As will be understood by persons skilled in the art, the process conditions of a delayed coker may vary greatly depending on the exact coker equipment and piping configuration, as well as the variations of the feed material and desired product. The above detailed description is for illustrative purposes, and is not intended to be restrictive. The teachings herein may be applied by those skilled in the art to be implemented on a variety of delayed coker units. Therefore, the invention is defined by the claims appended hereto and include other inventions not claimed that may be explicitly or inherently disclosed in this application, including all equivalents, modifications and enhancements thereto.

What is claimed is:

1. A method for automatic operation of a delayed coker comprising one or more pairs of coke drums, the method comprising:

operating the one or more pairs of coke drums in alternating cycles of filling a first drum of a pair with heated feed material while emptying a second drum of the pair;

initiating an automatic batch sequence computer control system configured to automatically operate one or more sets of double block valves, each set of double block valves including a first valve and a second valve positioned along process piping between the first drum of the pair and the second drum of the pair, wherein the process piping connects the one or more pairs of coke drums with additional components of the delayed coker through a sequence of steps for a complete coke drum cycle; and in one step of the cycle:

transmitting a command to close a set of the double block valves;

monitoring position sensors on the set of double block valves as a primary verification to confirm the double block valves are both closed;

monitoring a pressure at a valve isolation point between the set of double block valves to confirm the pressure between the double block valves has increased above a predetermined threshold as a secondary verification to confirm the double block valves are both closed;

confirming that the double block valves are both closed based on the primary verification;

confirming that the double block valves are both closed based on the secondary verification; and then advancing the control system to a next step of the coke drum cycle.

2. The method of claim 1, further comprising: in another step of the cycle:

transmitting a command to open the set of double block valves;

monitoring the position sensors on the double block valves as a primary verification to confirm the double block valves are both open;

confirming that the double block valves are both open based on the primary verification;

monitoring the pressure at the valve isolation point between the double block valves to confirm the pressure between the double block valves has decreased below a predetermined threshold as a secondary verification to confirm the double block valves are both open;

confirming that the double block valves are both open based on the secondary verification; and then advancing the control system to another next step of the coke drum cycle.

3. The method of claim 2, wherein the set of double block valves are coke drum overhead vent double block valves and the position sensors are located on the set of coke drum overhead vent double block valves, the method further comprising:

receiving signals from the position sensors on the set of coke drum overhead vent double block valves that confirm the double block valves are open;

receiving a signal from a pressure transmitter monitoring a pressure on the process piping between the overhead vent double block valves that confirms the pressure has decreased below a predetermined threshold; and then transmitting a signal to close a pressure relief block valve.

4. The method of claim 2, further comprising:

receiving signals from position sensors on a pressure relief block valve that confirms the pressure relief block valve is open;

receiving a signal from a pressure transmitter monitoring a pressure on the process piping between the pressure relief block valve and a pressure relief valve that confirms the pressure has decreased below a predetermined threshold; and then transmitting a signal to close overhead vent double block valves.

5. The method of claim 1, further comprising:

transmitting a signal to open a bottom drain valve to drain liquid from the coke drum;

receiving a signal from a first pressure transmitter monitoring a pressure on a feed line process piping;

receiving a signal from a second pressure transmitter monitoring a pressure on an overhead vapor line process piping;

calculating a difference between pressures on the feed line and the overhead vapor line;

after the difference in pressure between the pressure on the feed line process piping and the pressure on the overhead vapor line process piping decreases below a predetermined threshold that indicates the coke drum is drained of a sufficient amount of liquid, advancing the control system to a further step; and in the further step transmitting a command to open a top deheading valve on the coke drum.

6. The method of claim 1, further comprising:

receiving a signal from a first pressure transmitter monitoring a pressure on a steam supply line;

when feed material is flowing through a feed line, receiving a signal from a second pressure transmitter monitoring a pressure on the feed line;

calculating a difference between pressures on the steam supply line and the feed line;

confirming the difference in pressure exceeds a predetermined threshold that indicates the steam pressure is greater than the feed line pressure;

transmitting a signal to open a steam supply valve connecting with the feed line;

verifying the steam supply valve is open; and then transmitting a signal to close a feed isolation valve.

7. A computer control system for carrying out the method of claim 2, the system comprising:

a delayed coker comprising:

two or more coke drums operating in pairs in alternating cycles of filling one drum with heated feed material while emptying the other drum;

at least one set of double block valves positioned along process piping between two or more of the coke drums, wherein the process piping connects the coke drums with additional components of the delayed coker;

position sensors on the double block valves; and a device to monitor pressure between the double block valves;

a processor in communication with an operator work station, wherein the processor is configured to:

initiate the automatic batch sequence;

transmit the command to close the set of double block valves;

monitor the position sensors on the double block valves as the primary verification to confirm the double block valves are both closed;

monitor the pressure at a valve isolation point between the double block valves as the secondary verification to confirm the double block valves are both closed;

confirm that the double block valves are both closed based on the primary verification;

confirm that the double block valves are both closed based on the secondary verification;

advance the control system to the next step of the coke drum cycle; transmit the command to open the set of double block valves; and a memory in communication with the processor, the memory having stored thereon computer executable instructions that when executed by the processor perform the method.

8. The control system of claim 7, further comprising a safety interlock system in communication with the control system, the safety interlock system comprising logic encoded on memory that when executed performs the method of:

identifying a plurality of valves as hydrocarbon isolation points;

identifying a plurality of valves as atmosphere isolation points;

confirming that all valves on a hydrocarbon isolation point are closed before transmitting a signal to open a valve on an atmospheric isolation point; and confirming that all valves on an atmospheric isolation point are closed before transmitting a signal to open a valve on a hydrocarbon isolation point.

* * * * *